Sept. 21, 1971  D. C. CONNETT  3,606,755
POWER TRANSMISSON

Filed March 16, 1970  3 Sheets-Sheet 1

INVENTOR.
Donald C. Connett
BY Van Meter and George
ATTORNEY

United States Patent Office 3,606,755
Patented Sept. 21, 1971

3,606,755
POWER TRANSMISSION
Donald C. Connett, Huntington Beach, Calif., assignor to Sperry Rand Corporation, Troy, Mich.
Filed Mar. 16, 1970, Ser. No. 19,575
Int. Cl. F16h *39/46*
U.S. Cl. 60—53A    7 Claims

ABSTRACT OF THE DISCLOSURE

A variable displacement hydraulic pump or motor unit is biased toward neutral by centering springs in the case of the pump and toward maximum displacement in the case of the motor. Hydraulic servomotors are controlled by follow-up servovalves to oppose this bias for adjusting the displacement normally. A load responsive valve is connected in parallel with the servovalve or valves to dump the pressure applied to the servomotor and allow the biasing springs to reduce the displacement in the case of the pump or to increase it in the case of the motor. A hydraulic variable speed transmission utilizing such a pump and such a motor with a single load limiting valve is arranged to give priority to load limiting action at the motor before such action occurs at the pump.

In the construction of hydraulic variable speed transmissions, it is customary to rely upon pressure responsive relief valves for the purpose of limiting the load carried by the unit to a safe maximum value. With transmission units operating at higher pressures, larger volumes and under conditions which impose frequent overloads, the provision of an adequate pressure relief valve is costly and bulky and in all events generates heat and dissipates input power. It is an object of the present invention to provide a load-limiting system for use with a variable displacement pump or motor or both which avoids the generation of heat when the unit is subject to overload and which can be constructed in small space at minimum cost and may be used in a common small size for a large range of sizes of pump or motor units.

The invention consists of a variable displacement hydraulic pump or motor unit having a displacement varying member spring biased toward a position of maximum mechanical advantage relative to its load-imposed operating pressure and in which a hydraulic actuator for shifting the member in opposition to its bias is provided together with a means forming a source of controlled pressure for driving the actuator including a servovalve for controlling the admission of pressure from the source to the actuator; and a load-limiting valve is connected in parallel with the servovalve and is responsive to the load-imposed upon the unit for dumping the pressure applied to the actuator, thus allowing the actuator to move toward a more advantageous displacement position under the influence of its spring bias.

Figure 3:
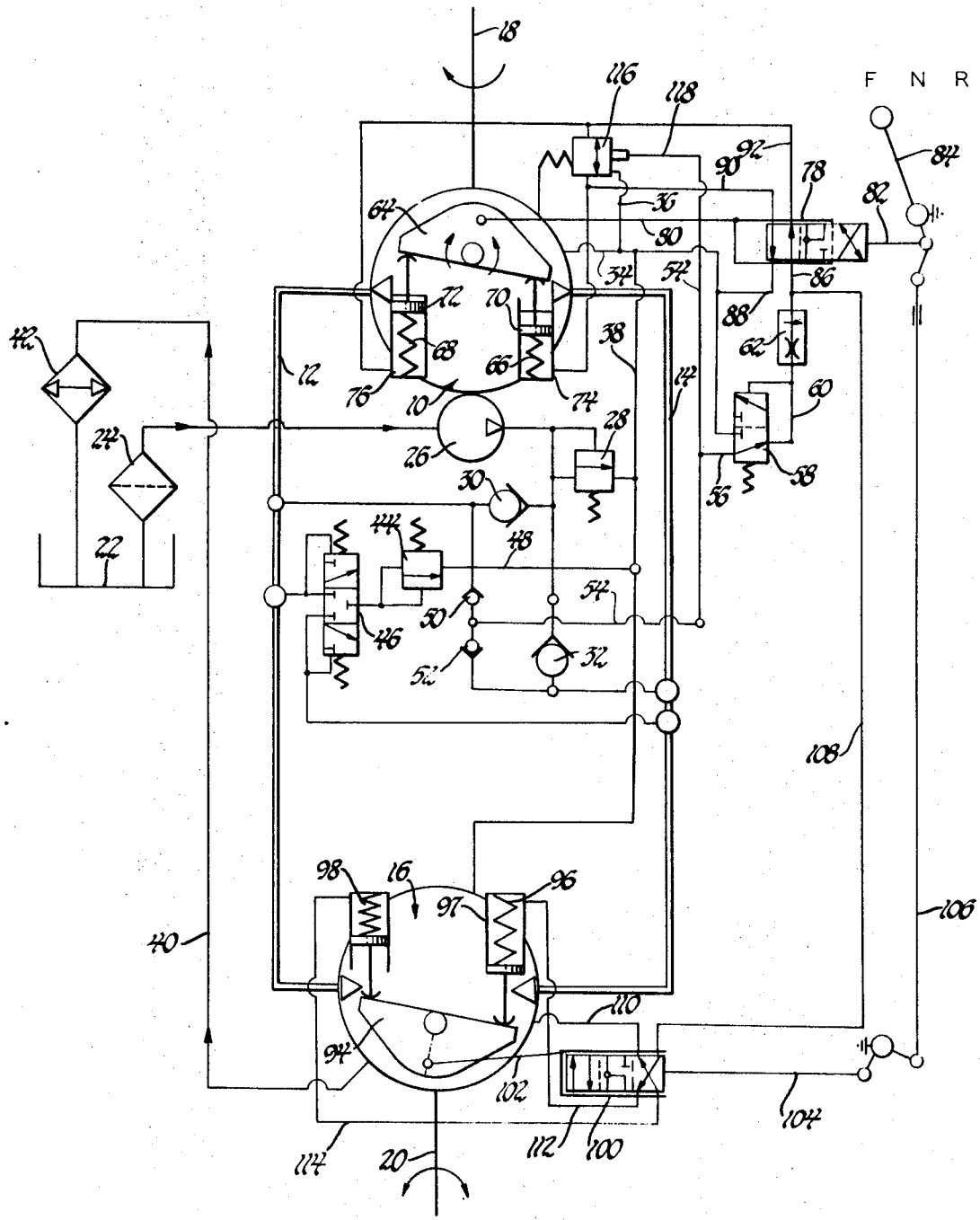
FIG. 3 is a circuit diagram of a hydraulic transmission unit using the valve of FIGS. 1 and 2 and illustrating the conditions when the hydraulic motor is adjusted to full displacement.

Referring first to FIG. 3, the reversible variable displacement hydraulic pump 10 is connected by main conduits 12 and 14 with a variable displacement motor 16 to form a variable speed ratio hydraulic transmission in which rotary mechanical power is received at the shaft 18 of pump 10 from a suitable prime mover and is transmitted at any selected speed ratio to a suitable load connected to the shaft 20 of the motor 16.

The usual auxiliaries for such a transmission are indicated at the sump 22, the filter 24, the replenishing pump 26 having its relief valve 28, and being connected via check valves 30 and 32 with the main lines 12 and 14 respectively. Drain lines 34, 36, 38 and 40 collect leakage and spent control fluid for return to the sump 22 via the heat exchanger 42. A relief valve 44 is connected via shuttle valve 46 with whichever one of the main lines is at the lower pressure at any time and serves to maintain a predetermined pressure in that line somewhat below the setting of relief valve 28.

For the purpose of supplying fluid under pressure for operating the displacement controls of the pump 10 and the motor 16, check valves 50 and 52 admit fluid from whichever of the mains 12 or 14 is at the higher pressure into a line 54 leading via branch 56 to a pressure reducing valve 58 which connects via a line 60 with a flow limiting valve 62, the outlet of which forms a supply of pressure fluid which is regulated as to maximum available pressure and flow.

The pump 10 may be of any suitable reversible, variable displacement type such as illustrated in the patent to Keel, No. 2,870,746. It may have a displacement varying member such as the oscillatable yoke 64. Suitable pre-loaded centering springs 66 and 68 serve to bias the yoke 64 to its centered position. Servo motors represented by the pistons 70 and 72 may be projected by the admission of control fluid to their respective cylinders 74 and 76 for pushing the yoke off center in one direction or the other. A suitable follow-up servovalve 78 is connected mechanically as at 80 with the yoke 64 and as at 82 with a suitable manual lever 84. The servovalve 78 is connected by line 86 with the outlet of valve 62 and by line 88 with the drain line 38. Motor lines 90 and 92 connect with the servomotors 74 and 76 respectively.

In a similar fashion, the motor 16 has a yoke 94 which is biased by a spring 96 within a servomotor 97 toward maximum displacement position. A servomotor 98 when supplied with pressure fluid can reduce the displacement of motor 16 against the bias of spring 96. A follow-up servovalve 100 is mechanically connected as at 102 with the yoke 94 and as at 104, 106 with the lever 84. A conduit line 108 supplies fluid from the outlet of valve 62 to the servovalve 100 and a line 110 connects with the drain line system. Suitable motor lines 112 and 114 connect with the servomotors 97 and 98 respectively.

Figure 4:
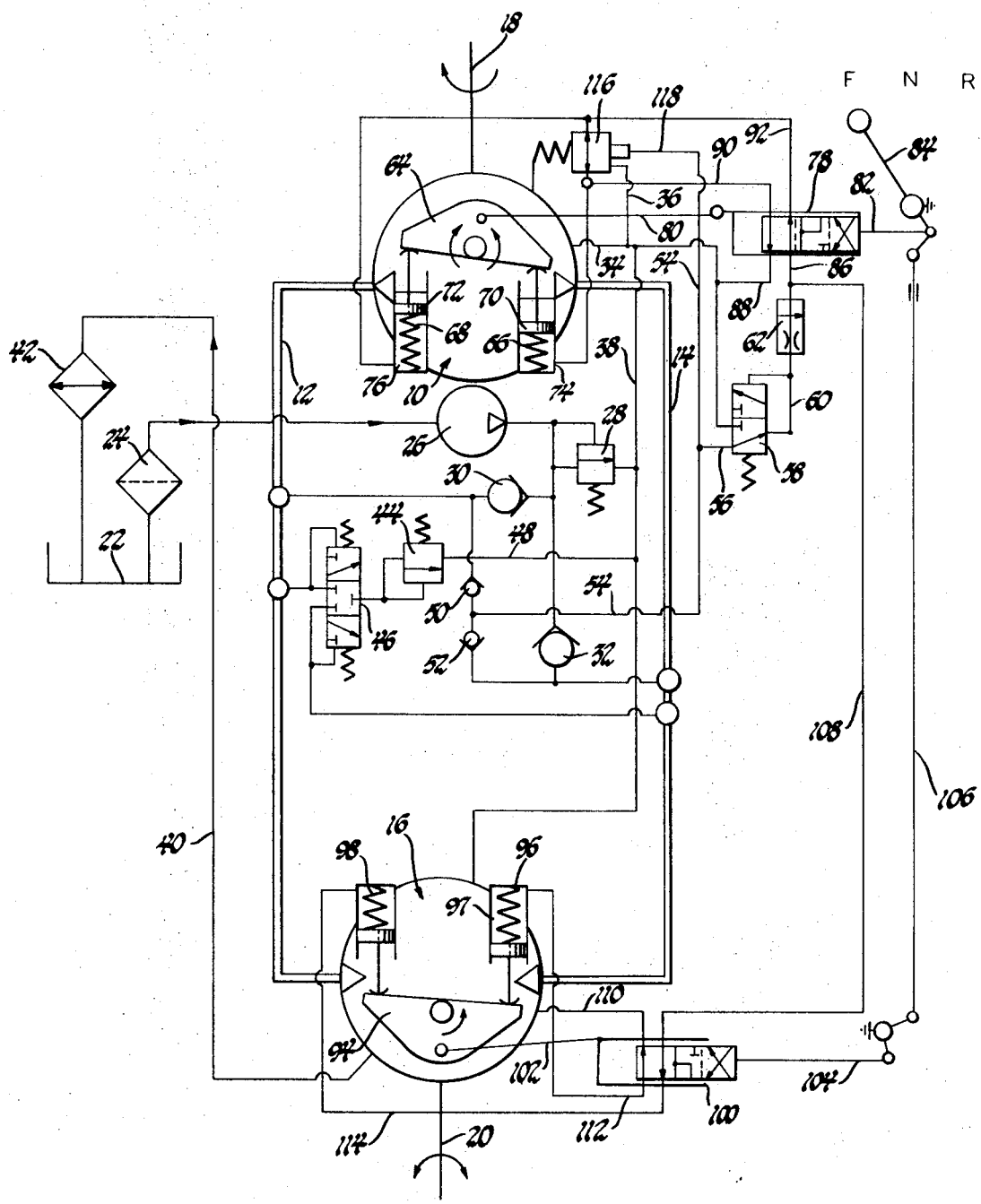
FIG. 4 is a view corresponding to FIG. 3 showing the conditions when the motor is adjusted to a position of minimum displacement.

The foregoing describes an arrangement of hydraulic transmission components which is representative of the state of the art prior to the present invention except that such transmissions have heretofore usually required the use of overload relief arrangements different from that diagramed at 44, 46 and 48. Commonly, there has been provided either a pair of pressure relief valves connected across directly between the main lines 12 and 14 in opposite direction, or else a single large relief valve and shuttle valve. Either arrangement is bulky and costly and introduces severe heating and valve seat erosion problems, particularly in the larger sizes of transmissions. The present invention overcomes these problems by avoiding any direct by-passing of high pressure fluid from one main line to the other and instead acts directly upon the displacement varying control system in a manner which will immediately increase the mechanical advantage of the input over the output of the system as a whole. That is to say, in the case of a complete transmission such as illustrated in FIGS. 3 and 4, the speed ratio between the input shaft 18 and the output shaft 20 is reduced and concomitantly, of course, the torque ratio is increased. In the case of a variable displacement pump alone, the output per revolution is reduced, and in the case of a variable displacement motor alone, the torque per unit of applied fluid pressure is increased.

These results are accomplished by the provisions of a load-limiting valve 116 which is connected directly across the motor lines 90 and 92 of the servovalve 78. While the load-limiting valve is closed, this connection is ineffective but when the valve opens, in response to an excessive load on the system, a by-pass is established which dumps pressure oil from whichever of the lines 90 or 92 is under pressure, to the other line. This in effect by-passes the servomotors 74 and 76, allowing the bias spring 66 or 68, whichever is under compression, to push the yoke 64 toward a position of lesser displacement. The valve 116, under these conditions, carries not only the cross flow between the two servomotors, but also carries the delivery of control pressure fluid from the outlet of valve 62. Furthermore, the by-pass through valve 116 also carries control pressure fluid from the servomotor 98 of motor 16, in the event that the yoke 94 of motor 16 happens to be set in a position of less than a maximum displacement.

Such a condition is illustrated in FIG. 4, from which it will be seen that the biasing spring 96 expands, expelling control fluid from servomotor 98 through lines 114, 108, 86 and 90 or 92. In the preferred arrangement, the biasing force of spring 96 and the areas of servomotors 97, 74 and 76 are so chosen as to allow the motor displacement to be increased to its maximum ahead of any change in displacement in the pump. In most units of the axial piston type, the natural forces acting on the yokes 64 and 94 aid in achieving this priority.

The valve 116 is spring biased to closed position and is, in the present form, made responsive to system pressure by its connection 118 with the line 54. This connection 118 leads to a small operating piston which opens valve 116 against its spring bias whenever a predetermined pressure level is achieved in either of the main lines 12 or 14. This is but one form of overload sensing arrangement for opening valve 116 and other forms which are responsive to shaft torque or to electric loads in the prime mover could also be utilized.

Figure 1:
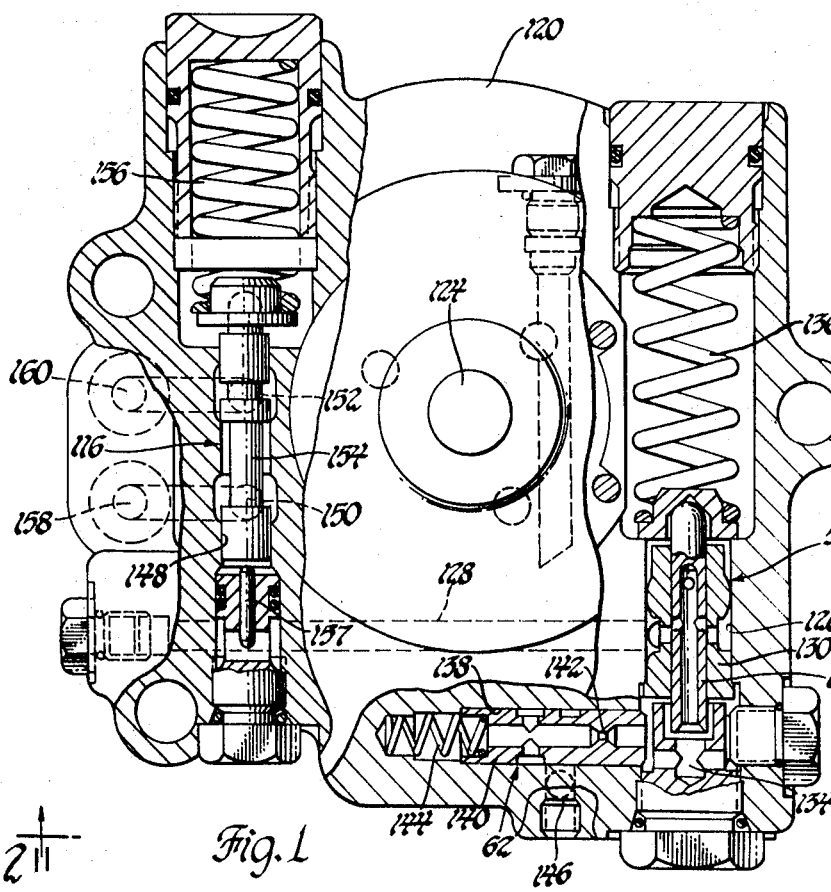
FIG. 1 is a top view, partly in section, of a control valve assembly incorporating a preferred form of the present invention.
Figure 2:
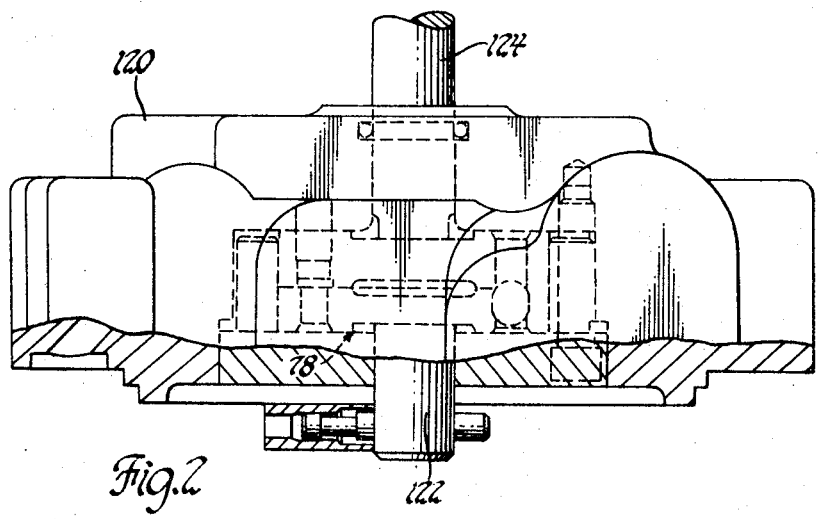
FIG. 2 is a side view of the assembly shown in FIG. 1.

Referring now to FIGS. 1 and 2, there is illustrated a valve assembly which incorporates a load limiting valve 116. This may be incorporated as a part of a multiple valve assembly contained within a body 120 and may include the servovalve 78, the pressure reducing valve 58 and the flow limiting valve 62. Mechanical connections for the servovalve are provided; such, for example, as the oscillatable shaft 122 which may be directly connected with the yoke 64 as indicated diagrammatically in FIG. 3 by the connection 80. An oscillatable shaft 124 forms the manual input member to the servovalve and corresponds to the diagrammatically indicated mechanical connection in 82 in FIG. 3. The structural details of the valves 58, 62 and 78 may take any suitable form as is well understood in the art. Servovalve 78 may be of the type described in copending application of Kenneth Court for Power Transmission, Ser. No. 173 filed Jan. 2, 1970.

Valve 58 is mounted in a bore 126 which intersects a passage 128 forming part of the passage 56 in FIG. 3 and which receives pressure fluid from one or the other of the main lines 12 and 14. A body member 130 is stationarily mounted in the bore 126 and slidably receives a spool 132 which in its lowermost position illustrated, carries flow from passageway 128 into outlet chamber 134. A load spring 136 holds the spool 132 down until the pressure in chamber 134 reaches a desired level at which time spool 132 rises, cutting off flow from the passage 128.

Outlet chamber 134 is in communication with a bore 138 which receives a spool 140 having an internal orifice 142. Load spring 144 urges the spool 140 to the right until the pressure drop across the orifice 142 is sufficiently high to overcome the spring load and shift the spool 140 to the position illustrated wherein communication is cut off from the outlet passage 146 which corresponds with pasage 86 in FIG. 3.

The load limiting valve 116 is located in a bore 148 having ports 150 and 152 which are normally closed from each other by the slidable spool 154. Spool 154 is biased to its closed position by load spring 156 and is urged upwardly by a small piston 157 which is exposed to main line pressure through passage 128. The ports 150 and 152 connect by passages 158 and 160 with the lines 90 and 92 illustrated in FIG. 3. It will be understood that the body 120 will carry also various other internal passages providing the necessary communication with the body of the pump or motor to which it is attached so that the connections diagramed in FIGS. 3 and 4 are established.

The operation of the load limiting arrangement is such that whenever an overload occurs, and which is always reflected in an abnormal rise in pressure in one or the other of the main lines 12 and 14, that this is sensed through the lines 54, 118 and 128 to force the load limiting valve 116 into its by-passing position against the bias of spring 156. This establishes direct communication not only between servomotors 74 and 76 but also between servomotors 96 and 98. Inherently, this also by-passes control pressure fluid being delivered from the outlet of valve 62 through line 86 and through line 108 to the servovalves 78 and 100 respectively.

With valve 116 open, biasing spring 96 together with the normal yoke reaction forces on yoke 94, exert a higher pressure in servomotor 98 than that exerted in servomotor 76 by biasing spring 66. If motor yoke 94 is, as shown in FIG. 4, in a position of less than maximum displacement, it will move to maximum displacement position before any motion takes place at the yoke 64. If this action is insufficient to eliminate the overloaded condition, then when motor yoke 94 reaches maximum displacement position, the biasing spring 66 will then urge yoke 64 toward center position. It can, of course, go all the way in the event that the output shaft 20 encounters a solid mechanical block.

It will thus be seen that the present invention provides a construction in which a relatively small valve at 116 may control the action of pump and motor systems of large size and high pressure without encountering the overheating, power wasting and valve erosion problems which are experienced with overload pressure relief valves acting directly across the main pressure lines of the system.

I claim:

1. A variable displacement hydraulic pump or motor unit having a displacement varying member spring biased toward a position of maximum mechanical advantage relative to its load-imposed operating pressure; a hydraulic actuator for shifting the member in opposition to its bias; means forming a source of control pressure for driving the actuator; a servovalve for controlling the admission of pressure from the source to the actuator; and a load limiting valve in parallel with the servovalve and responsive to the load imposed upon the unit for dumping the pressure applied to the actuator and allowing the actuator to move toward a more advantageous displacement position under the influence of its spring bias.

2. A unit as defined in claim 1 having a dual biasing means tending to hold the displacement varying member in a neutral position; and a dual actuator effective to shift the member away from neutral in either direction as controlled by the servovalve whereby the loads imposed on the unit acting as a reversible pump are limited during fluid delivery in either direction.

3. A unit as defined in claim 1 having a biasing means tending to move the displacement varying member toward maximum displacement; and an actuator effective to shift the member toward minimum displacement whereby the loads imposed upon the unit acting as a motor are limited.

4. A unit as defined in claim 1 wherein the servovalve has a mechanical follow-up connection with the displacement varying member.

5. A unit as defined in claim 1 wherein the load limiting valve is pressure responsive.

6. A variable speed hydraulic power transmission system having a variable displacement hydraulic pump and a variable displacement hydraulic motor; pump control means including two-way servomotor means spring biased toward neutral and pressure operated toward full displacement in either direction; a follow-up servovalve for controlling the servomotor means; motor control means including a one-way servomotor spring biased toward maximum displacement and pressure operated toward minimum displacement; and a load limiting valve responsive to the system operating pressure and connected in parallel with both servovalves to dump the pressure applied to the servomotors upon the system pressure exceeding a predetermined value.

7. A system as defined in claim 6 wherein the biasing forces applied when the motor is at minimum displacement produce a higher pressure in the one-way servomotor than the bias-produced pressure in the two-way servomotor means at the pump; whereby the load limiting action will take place by increasing the motor displacement prior to reducing the pump displacement.

References Cited
UNITED STATES PATENTS

| | | | |
|---|---|---|---|
| 3,126,707 | 3/1964 | Hann et al. | 60—53A |
| 3,230,699 | 1/1966 | Hann et al. | 60—53X |
| 3,411,297 | 11/1968 | Hann | 60—53X |

EDGAR W. GEOGHEGAN, Primary Examiner